US012753009B2

(12) United States Patent
Bouwman

(10) Patent No.: US 12,753,009 B2
(45) Date of Patent: Oct. 6, 2026

(54) METHOD FOR HANDLING GOODS, AND HANDLING SYSTEM, IN PARTICULAR ORDER-PICKING SYSTEM

(71) Applicant: KNAPP SYSTEMINTEGRATION GMBH, Leoben (AT)

(72) Inventor: Marinus Bouwman, Leoben (AT)

(73) Assignee: KNAPP SYSTEMINTEGRATION GMBH, Leoben (AT)

( * ) Notice: Subject to any disclaimer, the term of this patent is extended or adjusted under 35 U.S.C. 154(b) by 0 days.

(21) Appl. No.: 18/847,915

(22) PCT Filed: Mar. 9, 2023

(86) PCT No.: PCT/EP2023/055977
§ 371 (c)(1),
(2) Date: Sep. 17, 2024

(87) PCT Pub. No.: WO2023/180077
PCT Pub. Date: Sep. 28, 2023

(65) Prior Publication Data

US 2025/0243004 A1 Jul. 31, 2025

(30) Foreign Application Priority Data

Mar. 22, 2022 (EP) .................................... 22163471

(51) Int. Cl.
*B25J 9/16* (2006.01)
*B65G 1/137* (2006.01)

(52) U.S. Cl.
CPC .......... *B65G 1/1378* (2013.01); *B25J 9/1674* (2013.01); *B25J 9/1679* (2013.01)

(58) Field of Classification Search
CPC ... B25J 9/1679; B25J 9/1674; G05B 19/4183; G05B 19/4182; G05B 2219/40565;
(Continued)

(56) References Cited

U.S. PATENT DOCUMENTS 6,471,044 B1 * 10/2002 Isaacs .................. B65G 47/682 198/460.1
9,233,799 B1 1/2016 Mishra et al.
(Continued)

FOREIGN PATENT DOCUMENTS

WO 2018/153717 8/2018

OTHER PUBLICATIONS

Int'l Search Report (SR) (Form PCT/ISA/210) conducted in Int'l Appln. No. PCT/EP2023/055977 (May 22, 2023).
(Continued)

*Primary Examiner* — Stephen Holwerda
(74) *Attorney, Agent, or Firm* — GREENBLUM & BERNSTEIN, P.L.C.

(57) ABSTRACT

Method for handling goods and handling system for order-picking goods with an order-picking system, wherein goods are removed from a storage facility and positioned on a target load carrier. The goods are moved from the storage facility onto the target load carrier using a robot and/or a conveying system. Properties of the goods, in particular strength, rigidity, weight, surface composition, and/or center of gravity, are captured and, based on data regarding errors during movements of the goods. During operation of the handling system, boundary conditions up to which a functioning of the robot and/or of the conveying system depending on properties of the goods is ensured are determined, after which operation of the handling system is adapted depending on captured properties of the goods, namely through the adaptation of forces and/or accelerations that are applied to the goods by the robot and/or the conveying system.

19 Claims, 3 Drawing Sheets

(58) Field of Classification Search
CPC ........... G05B 2219/39102; G05B 2219/43099; G05B 2219/40542; B65G 1/1378
See application file for complete search history.

(56) References Cited

U.S. PATENT DOCUMENTS

| | | | | |
|---|---|---|---|---|
| 9,381,645 | B1 * | 7/2016 | Yarlagadda .......... | B65G 1/1378 |
| 10,471,597 | B1 * | 11/2019 | Murphy ................. | B25J 9/1674 |
| 2015/0144536 | A1 * | 5/2015 | Dugat ....................... | B07C 5/36<br>209/552 |
| 2016/0167228 | A1 * | 6/2016 | Wellman ................ | B25J 9/1602<br>901/3 |
| 2017/0080566 | A1 * | 3/2017 | Stubbs ................... | B25J 9/1679 |
| 2019/0030712 | A1 * | 1/2019 | Sciog ..................... | B25J 9/1661 |
| 2020/0143127 | A1 * | 5/2020 | Wagner .................. | B65G 47/91 |
| 2021/0271835 | A1 | 9/2021 | Wagner et al. | |

OTHER PUBLICATIONS

Int'l Written Opinion (WO) (Form PCT/ISA/237) conducted in Int'l Appln. No. PCT/EP2023/055977 (May 22, 2023).
Int'l Prelim. Exam. Report (IPER) (Form PCT/IPEA/409) conducted in Int'l Appln. No. PCT/EP2023/055977 (Jun. 25, 2024).

* cited by examiner

METHOD FOR HANDLING GOODS, AND HANDLING SYSTEM, IN PARTICULAR ORDER-PICKING SYSTEM

The invention relates to a method for handling goods with a handling system, in particular for order-picking goods with an order-picking system, wherein goods are removed from a storage facility and positioned on a target load carrier, wherein the goods are moved from the storage facility onto the target load carrier using a robot and/or a conveying system.

The invention furthermore relates to a handling system, in particular an order-picking system, with which goods can be moved from a storage facility onto a target load carrier using a conveying system and/or a robot.

Methods of the type named at the outset and corresponding handling systems, which are often embodied as order-picking systems, have become known well known from the prior art. Typically, goods are thereby removed from a storage facility in an automated manner and moved to a target load carrier, such as a pallet for example, using a conveying system, after which the goods are moved from the conveying system onto the target load carrier using a robot or the like and are stacked on said target load carrier according to a packing layout. Systems and methods of this type have become known from the document WO 2018/153717 A2, for example.

However, with methods of this type, only a low efficiency is achieved in many cases and, at the same time, methods of this type and systems from the prior art have proven to be susceptible to errors, namely especially when goods that are to be handled have unanticipated properties, for example, which is often the case in particular due to manufacturer-end changes with regard to packaging, and which at the same time also cannot be detected by a change in the bar code.

This is addressed by the invention. The object of the invention is to specify a method of the type named at the outset which is particularly efficient.

In addition, a handling system is to be specified with which a particularly efficient method for handling goods, in particular an efficient order picking, is possible.

According to the invention, the first object is attained with a method of the type named at the outset in which properties of the goods, in particular a strength, a rigidity, a weight, a surface composition, and/or a center of gravity, are captured and, based on data from operation of a handling system, in particular data regarding errors during movements of the goods, boundary conditions up to which a functioning of the robot and/or of the conveying system depending on properties of the goods is ensured are determined, after which operation of the handling system is adapted depending on captured properties of the goods, in particular through the adaptation of forces and/or accelerations that are applied to the goods by the robot and/or the conveying system.

In the course of the invention, it was found that conventional methods are inefficient particularly because, as a rule, all goods are handled using equal speeds and forces in said methods, wherein speeds and forces are, of course, chosen such that all goods order-picked using the handling system can be reliably handled. A speed of a transport of the goods from a goods receiving area to a storage facility, from the storage facility to an outgoing goods area, or a speed of the order-picking, thus corresponds to the speed at which even those goods which are the most inconvenient to handle can be handled, even though a very large portion of the goods could be handled at higher speeds. For example, goods with a lower center of gravity can be moved around a curve on the conveying system more quickly than goods which have a higher center of gravity with the same footprint, since the goods with the higher center of gravity could tip more easily.

In the course of the invention, it was then found that, if the most diverse properties of the goods are known, in particular with regard to mechanical properties such as a weight, a center of gravity, an area moment of inertia, a rigidity, a strength, a surface composition, a coefficient of static friction for a material pairing with a material of a robot gripper, for example, and similar properties, individual elements of the handling system such as a robot and the conveying system can be controlled such that they are matched to said properties, in order to ensure a physically possible maximum speed for each individual good and/or to be able to slow down in a targeted manner individual devices of the handling system, such as the robot and/or the conveying system, only when goods which would otherwise cause an error in the system are to be moved from the storage facility to the target load carrier. Errors in the handling system, or in the method with which goods are handled, are, for example, considered to be when a good cannot be moved from a goods receiving area into the storage facility according to plan and/or cannot be moved from the storage facility onto the target load carrier according to plan, for example because said good falls off the conveying system, in particular falls off a conveyor belt as a result of tipping due to an excessive lateral acceleration, cannot be gripped by a gripper according to plan, or causes damage during a placement on a good arranged beneath said good or on a packaging element such as a pallet, for example.

The same also applies in respect of an accuracy of handling or a precision of movements. For example, through a targeted utilization of sliding properties of goods on certain surfaces, in particular on surfaces of other goods, a very accurate positioning of goods on a target load carrier, or in positions according to a packing layout, can also be achieved with comparatively fast movements. For example, if the relevant mechanical properties are known, the goods can thus be released by a gripper in a targeted manner while the goods still have a horizontal speed, in order to reach the predefined positions.

It is thus possible, for example, to capture by means of a camera how far a certain good, which is placed with a known speed component in a horizontal direction on another good or on another surface such as a target load carrier, will still slide on the other good or the target load carrier, in order to determine sliding properties that can be used for later movements of similar goods or similar material pairings with regard to a coefficient of sliding friction. Changes of surface compositions can, of course, then be easily detected during continuous monitoring of positioning processes.

In addition, a particularly high packing density, which can likewise result in a more efficient method, can be obtained if dimensions of the goods, a load-bearing capacity, a load, a maximum possible overhang, minimum contact areas, and the like, are known and are taken into consideration during the calculation of the packing layout and handling of the goods.

Properties which are captured within the scope of the method in order to ascertain boundary conditions for the system can be the most diverse mechanical, optical, electrical, and magnetic properties of the goods that can be captured in an automated or manual manner. For example, it can be provided that an entire light spectrum around the goods is captured, and that aggregate states of the goods at highly different temperatures as well as mass properties, dimensions and changes therein, and temperatures of the goods are ascertained. In addition, it can also be provided that gradients, moments, and a behavior of the goods in linear or non-linear movement sequences are determined. Furthermore, devices for capturing sound emissions or immissions, that is, noise over the entire spectrum, can be provided. Other properties that can be captured within the scope of the method can be a magnetic behavior of the goods, or changes in the electric field or magnetic field of the goods. In addition, changes in an electric or magnetic field due to the movement of the goods in said field can also be captured as properties of the goods. The method can also be used to create a most complete possible physical, in particular mechanical, model of the goods and of the handling system, in order to be able to simulate gripping strategies and/or transport strategies, in particular order-picking strategies, and computationally compare different methods, after which an optical strategy is chosen and implemented.

Preferably, the data regarding properties of the goods are captured using the handling system, which can be embodied as an order-picking system, in particular during a transport of the goods from a goods receiving area into a storage facility and/or from the storage facility to an outgoing goods area. The handling system thus preferably comprises a goods receiving area, a storage facility which is connected to the goods receiving area, and an outgoing goods area, wherein the outgoing goods area is also connected to the storage facility. The handling system is preferably configured to remove goods from the storage facility in a targeted manner and to move said goods onto a target load carrier positioned in the outgoing goods area, in particular in a fully automated manner, wherein the goods are arranged on the target load carrier according to a packing layout.

Of course, the properties of the goods that are captured using the method according to the invention can also be included in the calculation of the packing layout, in particular properties regarding a load-bearing capacity of the goods, a required contact area, and/or a load that the goods exert on a device arranged below said goods, in particular an area load.

However, it can also be provided that the data regarding properties of the goods are supplied from outside of the handling system. For example, it can be provided that manufacturers of corresponding goods supply this data in that the data is captured during a production of the goods, for example. This data can also be used to ascertain permissible operating conditions of devices of the handling system, and thus to operate the handling system closer to permissible limits, whereby an increased efficiency is achieved.

The handling system, which can be embodied as an order-picking system, thus serves on the one hand to capture corresponding properties. For this purpose, devices for determining certain properties of the goods can be provided in the handling system, in particular a scale, devices for applying a predefined force and capturing a deformation caused by said force, devices for determining a center of gravity, an area moment of inertia, a weight distribution, a load-bearing capacity, and the like. In addition, it can be provided that certain properties of the goods can be captured solely by a behavior of the goods during a movement from the storage facility onto the target load carrier, in particular using cameras having an appropriately high resolution. It is thus possible, for example, to deduce a center of gravity using a tipping behavior of a good on a conveyor belt at a known speed or lateral acceleration. If goods with a known weight are placed on top of other goods on the target load carrier and a deformation of the bottom goods is captured, it is possible to deduce a rigidity of said bottom goods.

In addition to a partially or fully automated capture of properties of the goods, it can also be provided that properties are manually captured by an operator. Said operator can, for example, be instructed by means of a software application to work through a list of questions regarding specific goods, wherein a load-bearing capacity or a required contact area, for example, is captured by classifying the goods into certain classes. The software application can, of course, be implemented using a tablet or hand-held computer, so that visual aids can be provided for easy classification of the goods into certain classes. It can therefore be advantageous if properties of the goods are determined manually with the use of a list of questions. Accordingly, a significantly increased efficiency results if said properties of the goods are measured, preferably continuously, and are incorporated into the control of the method.

At the same time, boundary conditions up to which the individual devices of the handling system properly function can also be acquired in an automated manner, in that an error-free movement of a good from the storage facility onto the target load carrier with known properties and known speeds and forces of the individual devices is used to assign said properties of the goods to the individual devices as permissible properties at the chosen speeds and forces, so that as the operating time increases, data regarding permissible operating conditions of the individual devices of the handling system can be ascertained to an increasing extent. Analogously, impermissible operating conditions of the individual devices, such as of conveyor belts and robots, are ascertained using occurring errors, which are normally detected in an automated manner by sensors.

It is therefore preferably provided that boundary conditions of devices of the handling system, in particular boundary conditions of the robot and/or of the conveying system, are determined in that data regarding permissible operating conditions and impermissible operating conditions can be ascertained from error-free and error-associated movements of goods from the storage facility onto the target load carrier. Thus, permissible boundary conditions can, for example, be considered to be a certain speed up to which a good having a known center of gravity, a known footprint, and known surface properties can be moved around a curve of a certain conveying section without tipping.

As a result, using the method according to the invention, data regarding permissible and impermissible operating conditions, or limits up to which the individual devices properly function depending on the most diverse properties of the goods, are collected in an automated manner during operation. This data, in turn, allows conclusions about the maximum speeds and forces with which other products can be handled using these devices, so that operation of the handling system can be optimized depending on properties of the individual goods.

The properties of the goods that are captured in the method and are relevant for an efficient handling can, of course, also pertain to an interplay of individual goods. For example, it can be noted in the database that a first good, such a milk carton for example, can be arranged well and stably on a certain second type of good, such as a beer crate, but that the reverse is not possible or results in an unstable packing layout. Thus, not only are data regarding certain properties of the individual goods ascertained, but also data regarding interactions between the goods. This data can, of course, also be used to check computational models with which said interactions between the goods can be calculated based on properties of the individual goods, in particular using the finite element method or multibody simulations.

Thus, as the operating time increases, data can also be collected with regard to which goods can be placed on top of which other goods without goods tipping or breaking. Of course, the same also applies in respect of other interactions between goods, for example a heat transfer from one good to another, friction coefficients that result from material pairings of packaging of two goods, and the like, provided that said properties are relevant for a handling, in particular an order picking, of the goods.

It is therefore preferably provided that properties of the goods are determined which pertain to an interaction of the goods with other goods, in order to obtain a particularly efficient method.

The capture of the properties of the goods can take place in the most diverse ways. A particularly efficient method results if properties of the goods are captured by applying defined accelerations using the conveying system and capturing deformations of the goods. The goods are inevitably accelerated using the conveying system anyway, in order to move said goods from the storage facility to the target load carrier, for which reason no additional devices are required in this case, for example to capture a rigidity of the goods.

It has proven beneficial that a weight of the goods is captured via the conveying system and/or via the robot. For example, a robot with which goods are raised and lifted from the conveying system onto a target load carrier, can be equipped with a load cell, a force sensor, or a weight sensor, in order to be able to capture a weight of the goods that were picked up. It is then possible to omit an additional station in the handling system with which a weight of the goods is determined.

It is beneficial if the goods are captured optically, in particular by means of a 3D camera, an infrared camera, and/or a UV camera, during a movement on the conveying system and/or with the robot, wherein in particular deformations of the goods can be determined depending on accelerations of the goods. Based on the measured deformations of the goods with known accelerations, which are applied by means of the conveying system for example, or known forces, which are applied using a robot or a gripper for example, a mechanical model of the individual goods can be created in an automated manner, from which it is possible to deduce, for example, the speed at which a good can be moved through a curve on a conveyor belt before the good tips or the like, in order to be able to control a corresponding conveyor belt for an identical good such that said conveyor belt is optimally adapted to properties of the good.

In addition, by means of an infrared camera, objects inside of at least some packaging can be captured, so that it is possible, for example, to deduce a fill level, a load-bearing capacity, a tipping behavior, or the like, in order to then be able to determine a weight and/or a center of gravity.

A particularly effective implementation of the method results if properties of analyzed goods are used in order to be able to control the conveying system for identical or similar goods according to the previously captured properties of other goods. An assignment of the properties to the individual goods can thereby take place via an inventory number or a bar code that is printed on the goods, and alternatively also via optical features of the goods. This can be expedient particularly if a manufacturer keeps a bar code unchanged, but changes a packaging material or an article size for example, whereby relevant properties for the handling system, in particular a friction coefficient and a package size, are affected. Correspondingly, it is preferably provided that properties of the goods are assigned to an optical feature of the goods, in particular to a bar code and or a packaging of the goods, and are stored in a database. Thus, the database can thereby contain different goods and, accordingly, different properties assigned to a single bar code. As a result, the method according to the invention enables a significantly more detailed itemization of features of individual goods than is possible via a bar code with conventional databases, for example, wherein manufacturer-dependent special promotions, discounts, or the like, are, as a rule, not taken into consideration.

For example, a manufacturer can temporarily provide for a 20% larger packaging for a detergent as part of a promotion, even though the bar code is not changed at the same time. However, through the capture of optical features of the goods and correspondingly assigned mechanical properties, this deviation can be accounted for in the handling system according to the invention. Thus, goods available in the corresponding promotional period, having different dimensions, a different weight, and possibly a different packaging material, can also be optimally handled. In the case of conventional methods, in which goods are identified solely via the bar code, this would not be possible, so that properties of the goods which deviate during the promotional period would result in an error, for example during the formation of the packing layout.

A particularly good capture of mechanical properties is possible in the conveying system at points at which accelerations are applied to the individual goods in different directions. Accordingly, it is preferably provided that mechanical properties of the goods are captured at positions in the conveying system at which a change in speed of the goods occurs, in particular in positions at which the goods are decelerated in a first direction and accelerated in a second direction, wherein the second direction is approximately perpendicular to the first direction. This can be belt transfer units from a conventional conveying technology, for example. Typically, at the corresponding positions at least one camera is then respectively provided, with which camera the mechanical properties or deformations that are caused by the accelerations are captured. Mechanical properties are thus preferably captured at positions at which the goods are accelerated and/or decelerated in different directions. Normally, on corresponding devices there occurs at least one deceleration, or a negative acceleration, along a direction in which the goods are moved, and subsequently one acceleration of the goods in a second direction that can be perpendicular to the first direction, for example.

By capturing deformations and/or deflections of the goods at positions at which accelerations in different directions act on the goods, mechanical properties can be captured particularly well and, at the same time, easily.

Of course, the capture does not necessarily need to take place at a position at which the direction of the speed of the good is changed by 90 degrees. Instead, a smaller change in direction, for example by 45 degrees, can also be used to determine mechanical properties. In this case, the acceleration acting on the good can also be considered as a combined acceleration which comprises a component parallel to the initial movement direction and a component perpendicular thereto.

It is beneficial if magnetic properties of the goods are captured during a movement of the goods from the storage facility onto the target load carrier. These properties can also prove to be advantageous for ensuring a particularly efficient and, at the same time, low-error order picking.

It is advantageous if properties of the goods, in particular dimensions, are captured using a radar, in particular during a movement of the goods from the storage installation onto the target load carrier. It can also be provided that, at a storage facility receiving area at which the goods are delivered by truck and transported into the storage facility, for example, a corresponding station is provided with a radar with which external dimensions of the goods can be captured in a particularly accurate manner. This data can then be used for a storage and subsequently for an order picking. Thus, in combination with data regarding a strength and/or rigidity of the goods, a particularly efficient and stable formation of a packing layout can take place. Furthermore, it is thus easily possible to determine beneficial gripping points on the goods for a handling of the same using a robot.

Dimensions of the goods can, in principle, of course also be captured in other ways using a suitable capture system such as a camera or a light curtain, for example.

It is beneficial if properties of the goods and ascertained boundary conditions up to which a functioning of the robot and/or of the conveying system depending on properties of the goods is ensured are stored in a central database that is connected to multiple handling systems. It is thus sufficient if corresponding data are recorded in a first handling system in order to be able to correspondingly control other handling systems.

A cloud storage or a central database can thus be provided which is connected to multiple order-picking systems that respectively collect data regarding properties of the individual goods, which data is regularly synchronized with the central database or a data storage element of a central data processing device.

It shall be understood that a central data processing device does not necessarily need to be positioned such that it is physically separate from all handling systems; rather, it can also be arranged in a handling system. Furthermore, the individual handling systems can also be interconnected, so that an exchange of data does not necessarily need to take place via the central data processing device.

It is particularly beneficial if operation of a second handling system is adapted depending on properties of the goods captured with the second handling system and on boundary conditions acquired in a first handling system, in particular in order to maximize an order-picking performance. Despite this, there typically occurs, in a continuous manner, a checking and measurement of properties of the individual goods, in particular of size, weight, center of gravity, and the like, in order to be able to capture deviations from stored data in a particularly rapid manner and operate the handling system such that it is adapted accordingly. It has thus been shown to be disadvantageous for order-picking systems that manufacturers often change a packaging material without consulting logistics service providers, even though a logistical efficiency can be markedly affected thereby, for example since a stronger gripping force is necessary for a stable gripping with a gripper or the packaging material has a lower strength, so that said material can no longer bear as great of a load as before. Thus, through a continuous capture of the properties, it is possible to react very rapidly to changes of this type, whereby a high efficiency and a low error rate are achieved.

The other object is attained with a handling system of the type named at the outset which is configured to capture properties of the goods such as a strength, a rigidity, a weight, and the like, as well as to determine boundary conditions up to which a functioning of the robot and/or of the conveying system depending on properties of the goods is ensured, wherein the handling system is furthermore configured to adapt operation of the handling system depending on properties of the goods, in particular through the adaptation of forces and/or accelerations that are applied to the goods by the robot and/or the conveying system, wherein the handling system is in particular configured to carry out a method according to the invention.

The corresponding handling system is thus normally configured to actuate the conveying system and the robot depending on the actual properties of the individual goods in order to achieve a particularly high efficiency. A particularly high efficiency is typically also achieved in that, during a handling of the goods, properties of other goods are taken into consideration, which other goods interact with the goods being handled, for example in that they serve as a support for other goods.

Typically, a camera, in particular a 3D camera, in infrared camera, and/or a UV camera is provided with which a movement of the goods can be captured during a movement of the goods on the conveying system.

With a corresponding camera, it is possible, in combination with a data processing device, to create in an automated manner a mechanical model of the individual goods, in particular using finite element modeling, in order to be able to deduce maximum accelerations of the goods with the aid of said mechanical model.

Furthermore, visual data, or data recorded using a camera, can be used to deduce a packaging material and to rapidly capture product changes. For example, it can be provided that, in a database, an optical and/or mechanical 3D model of the individual goods is created, which model is regularly compared with goods that newly arrive and are captured by the camera, so that, in the event of deviations of an optical appearance, it can be rapidly checked whether other properties of the good have changed, for example a size, a weight, and a friction coefficient of a surface.

For an estimate of a friction coefficient of a surface, a reflectance of the surface can also be used or a comparison of a surface captured using the camera with images of surfaces having known friction coefficients, which images are stored in a database, can be used. In particular, a pattern recognition or machine learning can also be used for this purpose, in order to deduce mechanical properties of the goods with the aid of optically captured properties.

Alternatively or additionally to an analytical determination of maximum accelerations, a determination of the boundary conditions up to which the robot and/or the conveying system can handle the goods without a problem can also occur in that said boundary conditions are ascertained based on actual movements, wherein errors during the individual movements, or gripping or order-picking errors, are taken into account.

It is beneficial if the conveying system comprises a direction-changing device, in particular a belt transfer unit, with which a defined acceleration can be applied in different directions to the goods transported on the conveying system, wherein a camera is preferably arranged at the direction-changing device to capture deformations or deflections of the goods. This camera can, in turn, be connected to a data processing device with which mechanical properties of the goods can be determined based on deformations and on the known accelerations applied by the belt transfer unit.

Furthermore, it can be beneficial if a radar is provided for capturing dimensions of the goods. Through a particularly accurate capture of dimensions of the goods, a high efficiency during order picking and a high packing layout density can be achieved. Alternatively or additionally, dimensions can also be determined by another suitable capture system such as a camera or a light curtain, for example.

A handling system embodied as an order-picking system can, for example, comprise a storage facility and an order-picking station, wherein the order-picking station is connected to the storage facility by a conveying system such as a conveyor belt or a roller conveyor, for example. The advantages of a method according to the invention can be implemented particularly well with multiple corresponding order-picking systems, especially since data acquired using one order-picking system can then be used for control purposes in another order-picking system. Accordingly, it is beneficial if at least two handling systems, in particular order-picking systems, are provided which are embodied according to the invention, wherein a data processing device is provided which is connected to all handling systems, so that operation of one handling system can be adapted based on properties of the goods captured using said handling system and on boundary conditions of the robot and/or of the conveying system acquired using another handling system.

Additional features, advantages, and effects of the invention follow from the exemplary embodiment described below. In the drawings which are thereby referenced:

Figure 1:
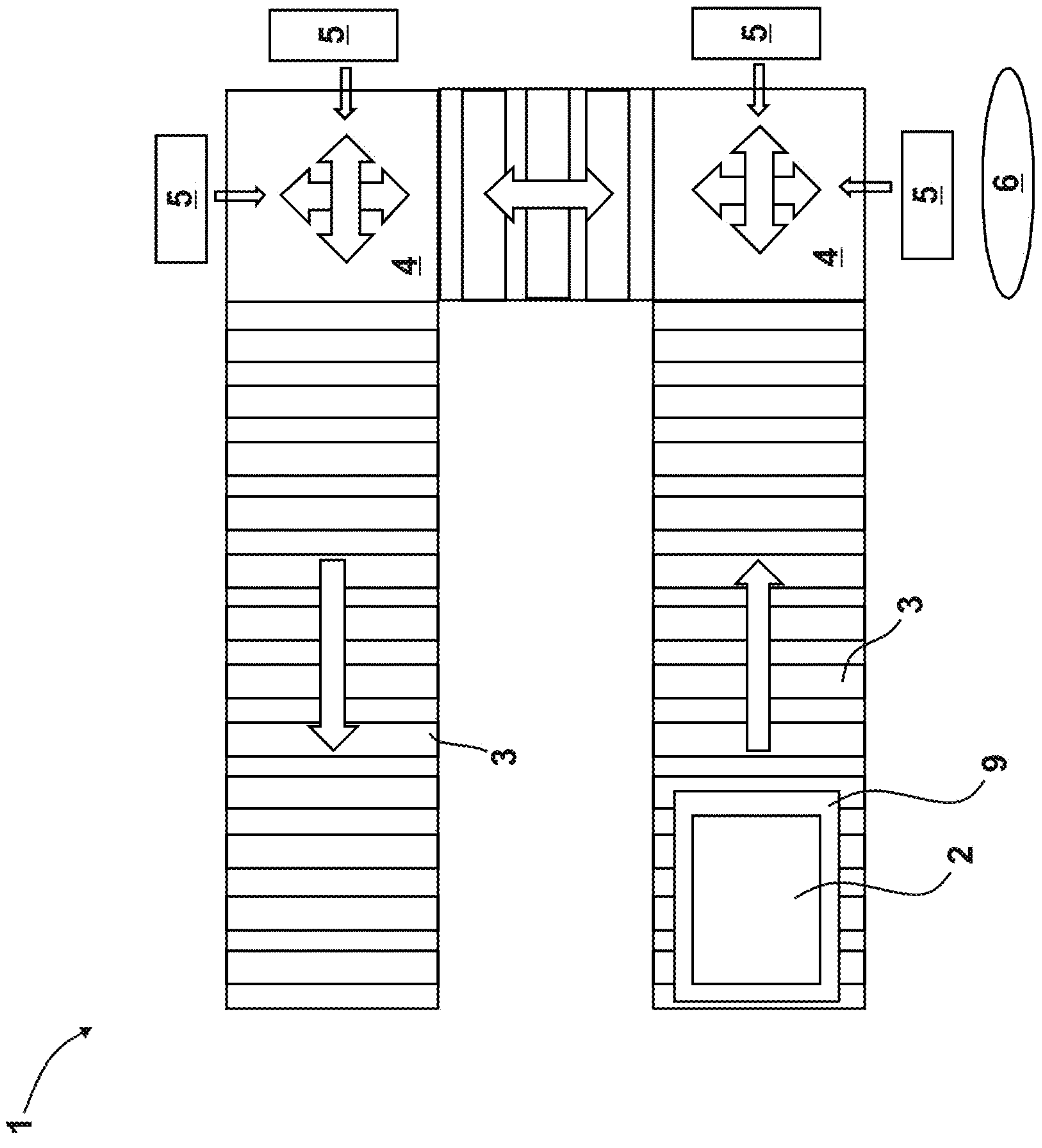
FIGS. 1 and 2 show a detail of a handling system according to the invention in different views.

FIG. 1 shows a plan view of a conveying system of a handling system according to the invention, which handling system is embodied as an order-picking system 1. As can be seen in this case, an article is conveyed from a storage facility to an order-picking space via a conveying section 3 of a conveying system, wherein a movement direction of the goods 2 is changed by 90 degrees at a belt transfer unit 4. Accordingly, there respectively occurs at the belt transfer unit 4 a delay of the goods 2 in a first spatial direction in an acceleration of the goods 2 in a second spatial direction arranged perpendicularly to the first spatial direction. At said belt transfer units 4, cameras 5 that can capture deformations of the goods 2 are arranged. Two cameras 5 are provided in the exemplary embodiment shown. It shall be understood that more than two cameras 5 can also be provided. Furthermore, it is also possible to capture data using only a single camera, which can be embodied as a 3D camera for example. Via the deformations of the goods 2, it is possible to deduce mechanical properties of the goods 2, in particular a rigidity, a weight, and the like, which properties of the goods 2 can then, for example, be assigned to the individual elements of the conveying system as permissible boundary conditions if the goods 2 are successfully positioned on a target load carrier 9, which is typically also captured in an automated manner.

It can be provided that a speed of the conveying equipment is increased until individual goods 2 can no longer be successfully moved to the target load carrier 9, for example because the goods 2 fall and/or tip off the conveying system. In this case, an operating state of the conveying system would thus be determined, which operating state is no longer permissible for the corresponding properties of the goods 2, so that a boundary condition for the conveying system is determined by functional and no longer functional movements from the storage facility to the target load carrier 9.

Alternatively or additionally, it can also be provided that, by means of the camera 5, known accelerations that act on the goods 2 at the belt transfer unit 4, and possibly other devices with which mechanical, electrical, and/or magnetic properties of the goods 2 are captured, a mechanical, electrical and/or magnetic model of the goods 2 is created in an automated manner, which model is used to ascertain, on the basis of known physical principles, the boundary conditions up to which devices of the order-picking system 1, such as robots and a conveying system, can be actuated without errors occurring during order picking.

A measuring device 6 is also illustrated. Said measuring device 6 can be used to capture one or more mechanical, optical, magnetic, and/or electrical properties of the goods 2, in order to be able to use said properties in particular for a model creation and ascertainment of boundary conditions of the devices of the order-picking system.

Figure 2:
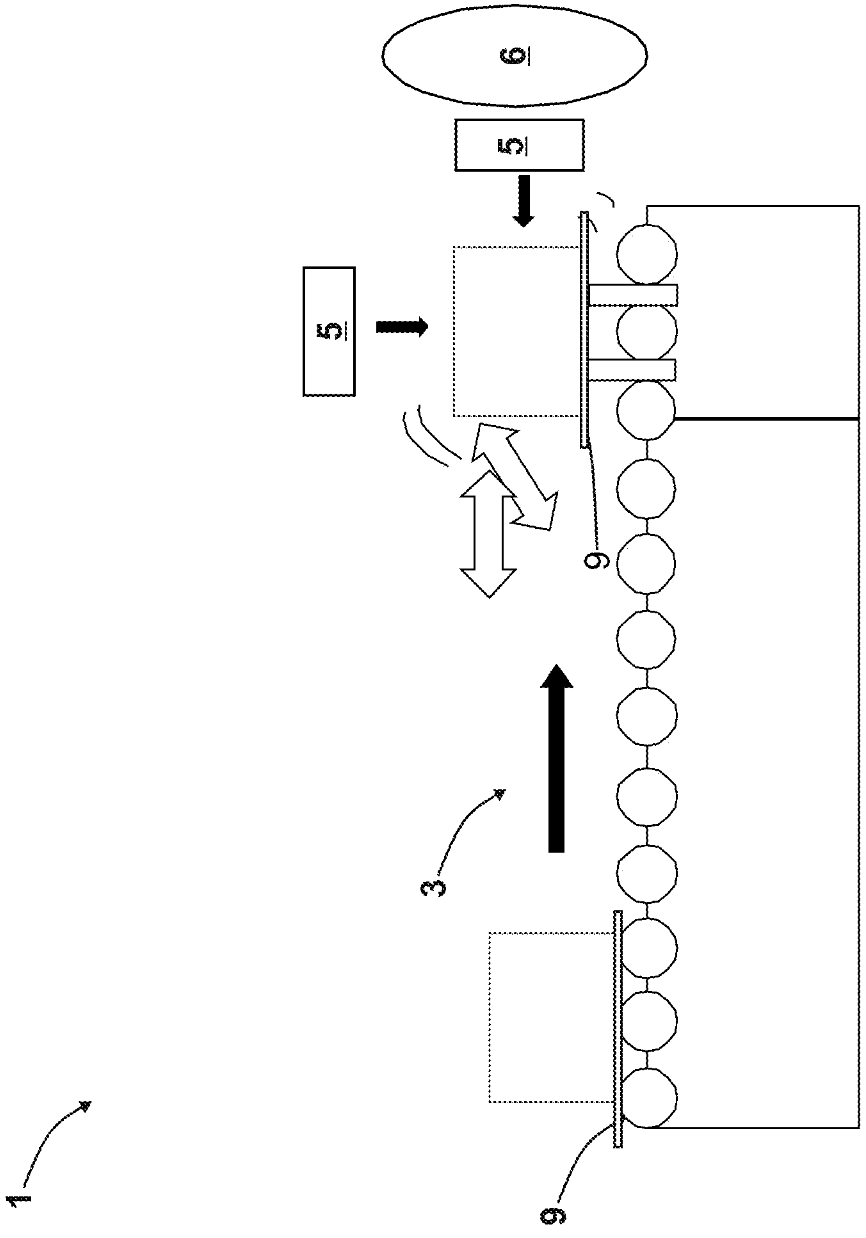

FIG. 2 shows a side view of the order-picking system 1 from FIG. 1. As can be seen in this case, multiple cameras 5 can be arranged at the belt transfer unit 4 in order to establish a most accurate possible 3D image of the goods 2. Additionally, other active or passive sensors, such as radar sensors or infrared cameras, for example, can of course be provided in order to determine a most accurate possible model of the individual goods 2.

Figure 3:
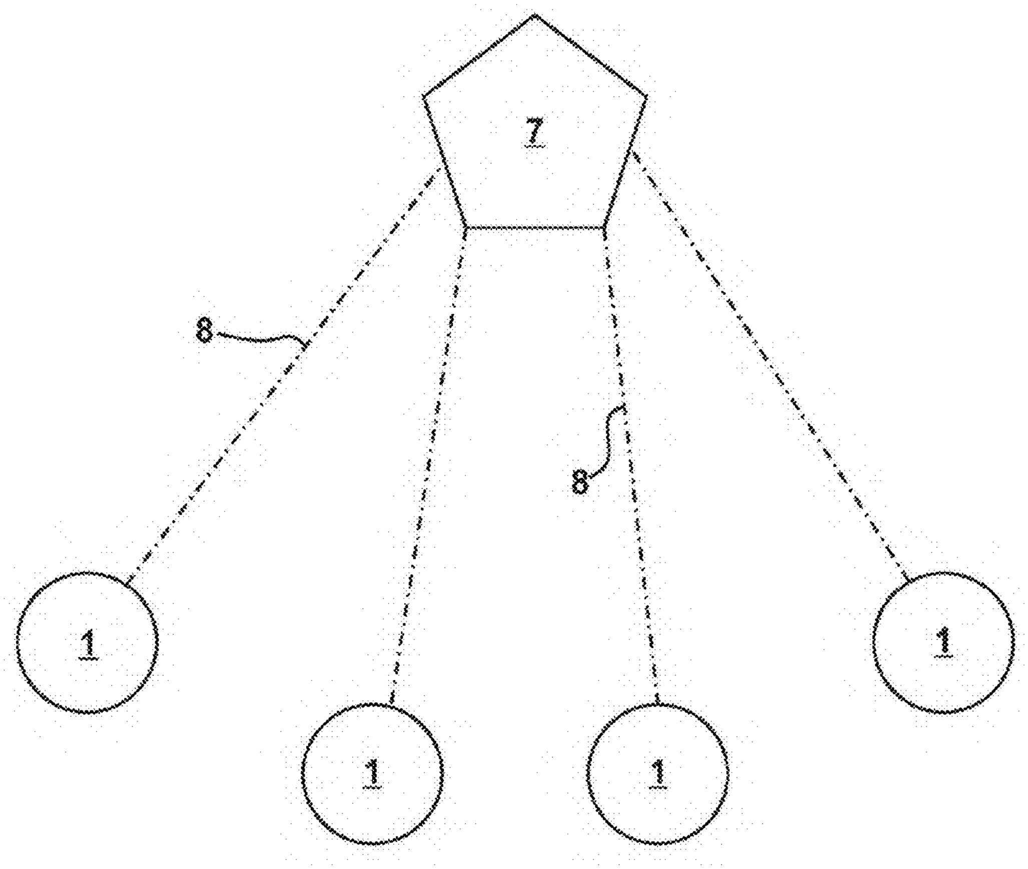
FIG. 3 shows an interaction of multiple handling systems with a central data storage.

FIG. 3 shows an interaction of multiple handling systems embodied as order-picking systems 1 with a central data processing unit that comprises a data storage 7. The individual order-picking systems 1 are connected to the data storage 7, for example a cloud storage, via data connections 8, so that data regarding properties of the goods 2 can be exchanged between the order-picking systems 1 via the data storage 7. Thus, if a manufacturer of a certain good 2 changes dimensions or packaging material of a good 2, for example, this can be captured using an order-picking system 1 and transmitted to the other order-picking systems 1 via the central data storage 7, so that errors due to handling parameters that are matched to the old properties of the goods 2 can already be avoided in these order-picking systems 1. Thus, a regular synchronization of the data that is captured using the individual order-picking systems 1 with regard to properties of the goods 2 takes place with the central data storage 7 via the data connections 8.

With a method according to the invention and a corresponding order-picking system 1, a particularly high efficiency during the order-picking of goods 2 from a storage facility onto a target load carrier 9 can be achieved, since the individual goods 2 can be individually measured and, at the same time, devices of the order-picking system 1 can be actuated such that they are matched to the properties of the goods 2. The order-picking system 1 is thus not actuated according to an object that is the most inconvenient to transport, as is often typical with order-picking systems 1 from the prior art; rather, an optimal speed can be attained in each case.

The invention claimed is:

1. A method for handling goods with a handling system that includes a conveying system, comprising:
   - positioning goods removed from a storage facility onto a target load carrier, the removed goods being moved from the storage facility onto the target load carrier using the conveying system,
   - capturing properties of the goods by applying defined accelerations using the conveying system and capturing deformations and/or deflections of the goods,
   - based on data regarding errors during movements of the goods during operation of the handling system, determining boundary conditions up to which a functioning of the conveying system depending on captured properties of the goods is ensured, and
   - adapting operation of the handling system depending on the captured properties of the goods, through an adaptation of forces and/or accelerations that are applied to the goods by the conveying system.

2. The method according to claim 1, wherein the boundary conditions of the conveying system, are determined from data regarding permissible operating conditions and impermissible operating conditions ascertained from error-free and error-associated movements of goods from the storage facility onto the target load carrier.

3. The method according to claim 1, wherein at least one of:

while moving on the conveying system, the properties of the goods are captured optically by at least one of a 3D camera, an infrared camera, and/or a UV camera, and determining deformations of the goods depending on accelerations of the goods.

4. The method according to claim 1, further comprising assigning the captured properties of the goods to an optical feature, of a bar code and/or a packaging of the goods, and storing captured properties assigned to the optical feature, bar code and/or packaging of the goods in a database.

5. The method according to claim 1, further comprising capturing mechanical properties of the goods at positions in the conveying system at which a change in speed of the goods occurs, and/or at positions at which the goods are decelerated in a first direction and accelerated in a second direction that is approximately perpendicular to the first direction.

6. The method according to claim 1, further comprising capturing magnetic properties of the goods during a movement of the goods from the storage facility onto the target load carrier.

7. The method according to claim 1, wherein the captured properties of the goods, include dimensions, and the method further comprises capturing the dimensions of the goods with a radar while the goods move from the storage facility onto the target load carrier.

8. The method according to claim 1, wherein the captured properties of the goods are manually determined using a list of questions.

9. The method according to claim 1, wherein the captured properties of the goods which pertain to an interaction of the goods with other goods are determined.

10. The method according to claim 1, further comprising storing in a central database the captured properties of the goods and the determined boundary conditions up to which the functioning of the conveying system depending on properties of the goods is ensured, wherein central database is connected to multiple order-picking systems.

11. The method according to claim 1, wherein the handling system comprises a first and a second handling system and the method further comprises adapting operation of the second handling system depending on captured properties of the goods in the second handling system and on boundary conditions acquired in the first handling system to maximize an order-picking performance.

12. The method according to claim 1, wherein the handling system is an order picking system for order-picking goods and wherein the captured properties of the goods include at least one of strength, rigidity, weight, surface composition, and/or center of gravity.

13. A handling system configured to move goods from a storage facility according to the method of claim 1, the handling system comprising:

a target load carrier configured to receive the goods from the storage facility; and a conveying system configured to move the goods from the storage facility onto the target load carrier;

wherein, by applying defined accelerations using the conveying system and capturing deformations and/or deflections of the goods, properties of the goods are capturable, wherein, based on data regarding errors during movements of the goods during operation of the handling system, boundary conditions up to which a functioning of the conveying system depending on captured properties of the goods is ensured are determinable, and wherein operation of the handling system is adaptable depending on the captured properties of the goods through an adaptation of forces and/or accelerations applied to the goods by the conveying system.

14. The handling system according to claim 13, further comprising a camera, a 3D camera, an infrared camera, and/or a UV camera with which a configured and arranged to capture movement of the goods on the conveying system.

15. The handling system according to claim 13, wherein the conveying system comprises a direction-changing device, that includes a belt transfer unit and with which defined accelerations are appliable in different directions to the goods transported on the conveying system, and further comprises a camera configured to capture deformations and/or deflections of the goods and being arranged at the direction changing device.

16. The handling system according to claim 13, further comprising a radar configured for capturing dimensions of the goods.

17. A set, comprising:

at least two handling systems according to claim 13, a data processing device connected to the at least two handling systems, wherein operation of one of the at least two handling is adaptable based on properties of the goods captured by the one handling system and on boundary conditions of the conveying system acquired using another of the at least two handling systems.

18. The handling system according to claim 13, wherein the handling system is an order picking system for order-picking goods and wherein the captured properties of the goods include at least one of strength, rigidity, weight, surface composition, and/or center of gravity.

19. The set according to claim 17 is an order picking system for order-picking goods.

* * * * *